INVENTORS R. T. ADAMS
G. RAISBECK
BY [signature]
ATTORNEY

Aug. 11, 1964 R. T. ADAMS ETAL 3,144,606

PASSIVE SATELLITE REPEATER SYSTEM HAVING ORIENTATION COMPENSATION MEANS

Filed Dec. 29, 1961 3 Sheets-Sheet 2

INVENTORS R. T. ADAMS
G. RAISBECK
BY [signature]
ATTORNEY

INVENTORS R. T. ADAMS
G. RAISBECK
BY [signature]
ATTORNEY

United States Patent Office 3,144,606
Patented Aug. 11, 1964

3,144,606

PASSIVE SATELLITE REPEATER SYSTEM HAVING ORIENTATION COMPENSATION MEANS

Robert T. Adams, Short Hills, N.J., and Gordon Raisbeck, Lexington, Mass.; said Adams assignor to International Telephone and Telegraph Corporation, New York, N.Y., a corporation of Maryland, and said Raisbeck assignor to Bell Telephone Laboratories, Incorporated, New York, N.Y., a corporation of New York Filed Dec. 29, 1961, Ser. No. 163,344
8 Claims. (Cl. 325—4)

This invention relates to space communication systems and, more particularly, to a high gain, passive satellite repeater system.

Space satellite repeaters for use in communication systems are generally classified as either passive or active repeaters, the former of which employs a reflective surface to direct electromagnetic waves from one ground station to another and the latter of which provides amplification of electromagnetic waves impinging upon the repeater from one ground station and retransmission of the amplified electromagnetic waves from the repeater toward the other ground station. Active and passive repeaters each have unique characteristics which prove advantageous in space communications, but also have drawbacks which must be considered in choosing between the two. The final selection is usually made in favor of the type of repeater the shortcomings of which can most easily be overcome.

Active satellite repeaters understandably are capable of delivering a larger quantity of signal power to the ground receiver for the same amount of power radiated from the ground transmitter than passive satellite repeaters. This characteristic makes possible a larger signal-to-noise ratio at the receiver output, thus, higher quality transmission, and permits utilization of less complex ground transmitter and receiver equipment. The already higher power available at the ground receiver can be further enhanced by atitude stabilization of the satellite body to permit more efficient use of the repeater power supply by employing a directional antenna system to retransmit from the satellite repeater toward the ground receiver.

One of the foremost considerations in satellite repeater design is the lifetime of the repeater. To justify the great cost of placing a satellite repeater in orbit and the high initial price of the satellite itself, the repeater should be expected to last many years without need of maintenance. Both attitude stabilization and signal amplification found in the active satellite repeater necessitate extensive and complex equipment, all of which is, of course, subject to failure. When it is considered that failure of one component of the repeater may render the satellite repeater wholly ineffective, the desirability of simplicity in design and reliability of components not obtainable in active repeaters becomes apparent.

By turning to passive satellite repeaters in the form of reflective spheres and the like, the potential sources of failure found in active repeaters are virtually eliminated and a longer satellite life might be expected. The efficiency of transmission between transmitter and receiver in such a system is not very satisfactory for some applications, however. An obvious modification of the passive repeater to improve the efficiency of transmission between transmitter and receiver stations is to use flat reflective surfaces. In order to carry on effective communications, however, exacting attitude control of the satellite body upon which the flat reflectors are mounted is required. Hence, serious sources of failure also arise in passive repeater systems when it is attempted to improve their efficiency of transmission.

It is, therefore, the object of the present invention in a space satellite repeater system to improve the efficiency of transmission between a transmitter and a receiver via a crudely stabilized or completely unstabilized passive satellite repeater.

According to the above object, communication between ground transmitter and receiver stations is established through a crudely or partially stabilized or a completely unstabilized space satellite repeater provided with a reflective diffraction grating on its surface. Such a grating produces very sharp, high-gain reflection lobes, the direction of which are dependent upon the frequency of the incident electromagnetic wave. As the orientation of the satellite with respect to the ground stations changes, the angle of reflection from the repeater is likewise changed to maintain reflection from the satellite in the direction of the ground receiver by adjusting at the transmitter the frequency of the carrier signal upon which the information to be conveyed to the receiver is modulated.

More particularly, information signals are transmitted from a first station to a second station and a control signal is developed at the second station indicative of the changes in frequency required of the carrier signal to maintain transmission via the satellite as its orientation varies. The control signal is transmitted back to the first station where it is employed to adjust the frequency of the oscillator supplying the carrier signal, thereby changing the angle of reflection from the repeater to compensate for changes in satellite orientation.

In a two-way transmission system the control signal developed at the second station takes the form of a carrier having the frequency that will maintain communication between the first station and the second station. The carrier is employed for transmission of information to the first station. The carrier transmitted from the second station is then abstracted upon reception at the first station and used to control the frequency of the carrier generated at the first station.

The above and other features of the invention will be considered in detail in the following specification taken in conjunction with the drawings in which.

Figure 3A:
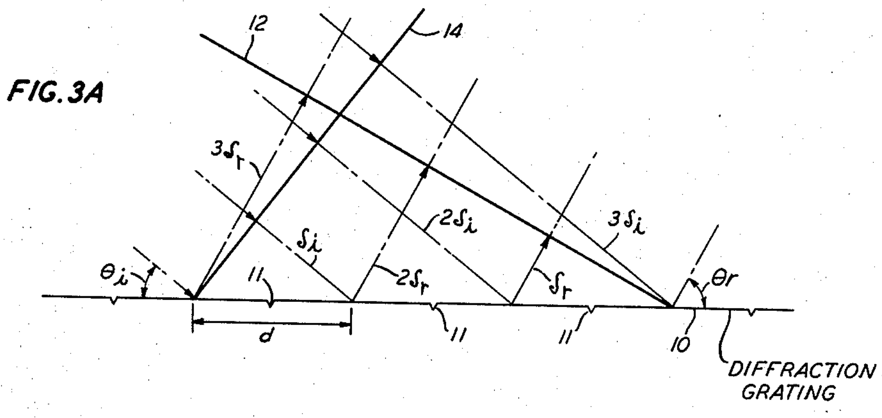
FIGS. 3A and 3B illustrate the process of reflection from a reflecitve diffraction grating and a typical radiation pattern from a reflection grating, respectively.

In FIG. 3A a surface 10 represents a reflective diffraction grating which is composed of a flat reflector having parallel grooves 11, shown in cross section, etched upon its surface. It is well understood that in order for constructive interference of electromagnetic waves reflected from a surface like 10 to occur along some wavefront 12, the pathlength for each ray of the electromagnetic wave from an incident wavefront 14 to surface 10 and then to wavefront 12 must be a whole number of wavelengths of the wave being accommodated. This relationship may be defined by the expression $$\delta_t = \delta_i + \delta_r = d \cos \theta_i + d \cos \theta_r \qquad (1)$$

where $\delta_t$ is the total pathlength between incident wavefront 14 and reflected wavefront 12, $\delta_i$ is the pathlength between incident wavefront 14 and surface 10, $\delta_r$ is the pathlength between surface 10 and wavefront 12, $d$ is the distance between grooves 11 in surface 10, $\theta_i$ is the angle between the direction of movement of the incident wave and surface 10, and $\theta_r$ is the angle between the direction of movement of the reflected wave and surface 10. As stated above in qualitative terms, for constructive interference of reflected wavefront 12 to occur, the relationship $$\delta_t = n\lambda = \frac{nc}{f} \qquad (2)$$

must be satisfied, where $n$ is an integer, $\lambda$ is the wavelength of the incoming electromagnetic wave, $f$ is the frequency of the incoming electromagnetic wave, and $c$ is the speed of light. From Equations 1 and 2 above, the angle of reflection from surface 10 may be expressed as a function of frequency by the expression $$\theta_r = \cos^{-1}\left[\frac{nc}{fd} - \cos\theta_i\right] \qquad (3)$$

Usually Equation 2 is satisfied at plural frequencies and, therefore, different orders of constructive interference occur at different values of $\theta_r$ for the various values of $n$ in Equation 3, the exact number depending upon the value of $f$, $d$, and $\theta_i$. At any rate, for effective diffraction, surface 10 must be capable of generating the lowest order diffraction component. Therefore $d$ must be larger than $\lambda/2$.

Figure 3B:
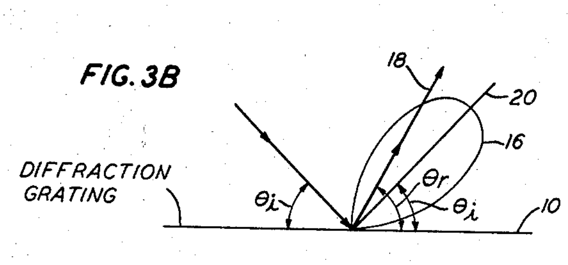

The pattern of reflection from surface 10 is illustrated in FIG. 3B. The composite reflection pattern in the plane perpendicular to grooves 11 and surface 10 comprises the product of a specular reflection component indicated by an outline 16 and diffraction components of the different orders, one order of which is indicated by line 18. On the other hand, the reflection pattern in the plane perpendicular to surface 10 and parallel to grooves 11, not shown, is unaffected by grooves 11 and is completely specular. The direction of higest intensity of the specular reflection component indicated by line 20, is, of course, equal to the angle of incidence of the incoming wave. The direction of reflection of the diffraction component is, as expressed above in Equation 3, a function of frequency. The direction of the resultant reflection pattern coincides with that of the diffraction component shown by line 18. A large variation or sweep of the angle of component 18 within outline 16 can take place before diffractive reflection from surface 10 becomes inefficient.

Figure 4A:
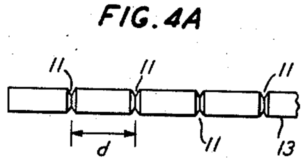
FIGS. 4A, 4B and 4C show reflective diffraction gratings suitable for use according to the invention mounted on bodies of sundry shapes.
Figure 4B:
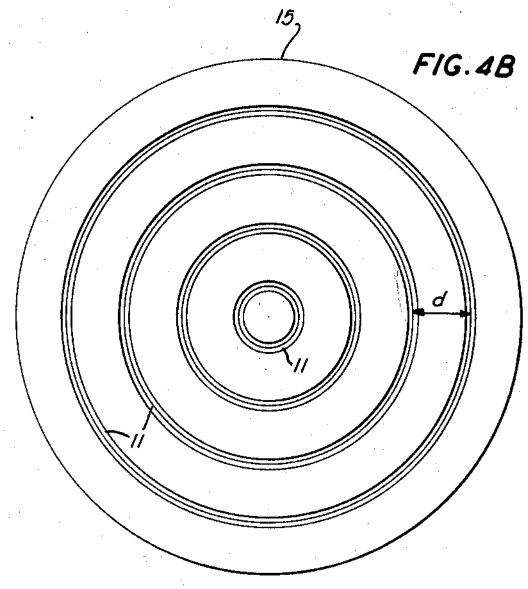
Figure 4C:
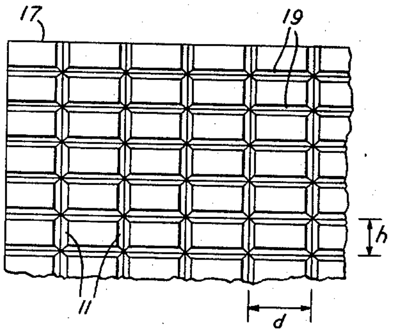

FIGS. 4A, 4B and 4C illustrate three-dimensional reflective diffraction gratings of various configurations which may be employed as a passive satellite repeater. FIG. 4A shows a reflective diffraction grating in the form of a rod 13 with parallel grooves 11 cut on its cylindrical surface. Such a grating could be produced by revolving the profile of surface 10 in FIG. 3A about an axis parallel to surface 10. FIG. 4B discloses a reflective disc 15 also having annular diffraction gratings imposed upon its surface. This configuration could be formed by revolving the profile of surface 10 in FIG. 3A about an axis perpendicular to surface 10. Both the gratings of FIGS. 4A and 4B produce reflection patterns which are annular, i.e., concentrate a large portion of reflected energy in a ring.

In FIG. 4C a two-dimensional grating is shown which produces reflection directional and variable in two dimensions, i.e., a pencil beam. Grooves 11 are etched in a plane surface 17, as was the case with surface 10 of FIG. 3A, and a second set of parallel grooves 19 is etched in surface 17 at right angles to grooves 11, at a distance $h$ from one another, forming rectangular reflective sections. The distance between grooves 11, $d$ for best results would be a great deal different from thhe distance between grooves 19, $h$, as indicated in FIG. 4C. Then, as the frequency of the incident wave is varied over the range of interest, one order of diffraction sweeps over the angle of interest in one plane (in FIG. 4C the plane parallel to grooves 19), but in the perpendicular plane (in FIG. 4C the plane parallel to grooves 11) many orders of diffraction come into play and sweep over the angle of interest one after the other. The resultant sweep of the reflection lobe of interest proceeds to cover the entire solid angle of interest in a pattern similar to the scanning sequence in television.

Several space satellite communication systems employing a crudely stabilized or completely unstabilized passive repeater composed of a reflective diffraction grating will now be considered. For the purpose of these illustrations, the rod-shaped diffraction grating of FIG. 4A is employed, although it will be understood that many types of reflective surfaces with a diffraction grating including those considered above, could be used with a similar result if appropriate circuit modifications are made.

Figure 1A:
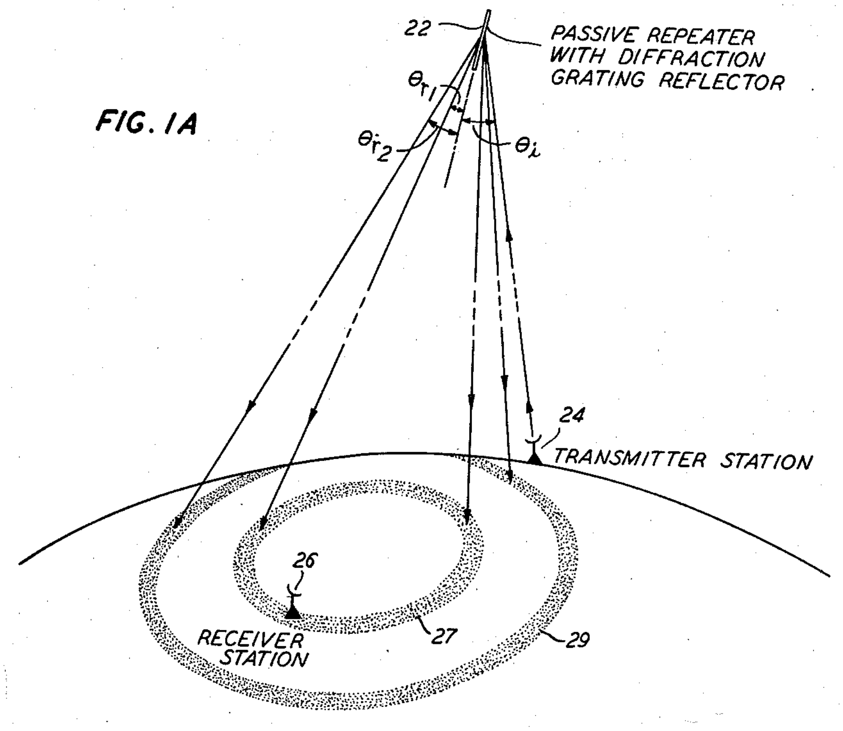
FIGS. 1A and 1B depict one embodiment of the invention.

In FIG. 1A, a passive repeater 22 reflects signals impinging at an angle $\theta_i$ from a ground transmitter 24 at an angle $\theta_{r_1}$ to a ground receiver 26. Rings 27 and 29 represent different orders of diffraction from reflector 22. When ring 27 impinges upon receiver 26, as shown, transmission from transmitter 24 to receiver 26 is established and the frequency of the electromagnetic wave radiated from transmitter 24 is the desired value. This occurs when Equation 3 is satisfied.

Figure 1B:
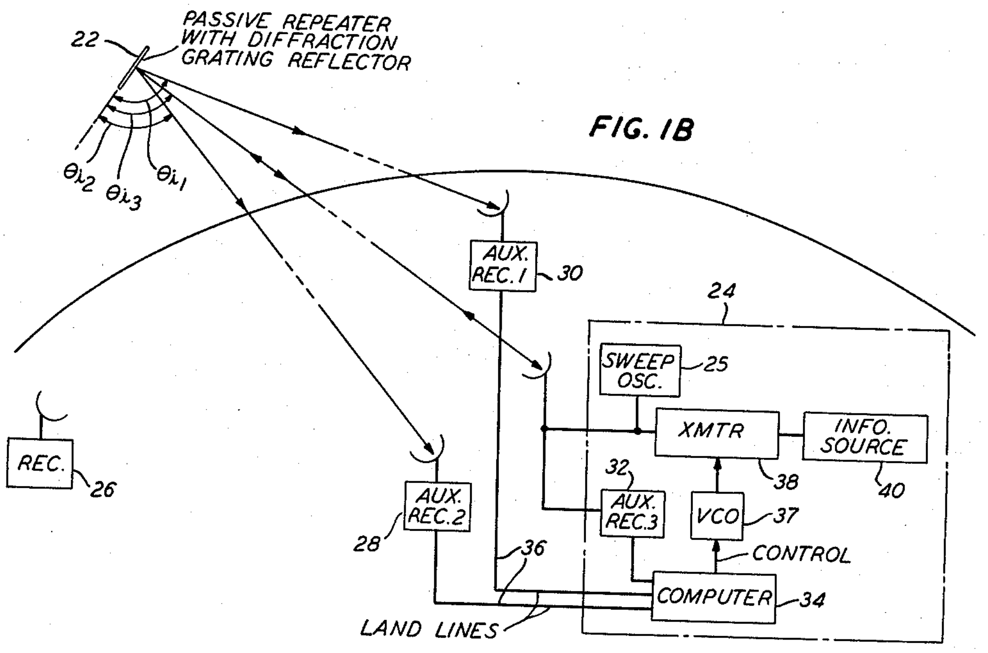

Reference is now made to FIG. 1B to illustrate one means for establishing and maintaining transmission from transmitter station 24 to receiver station 26. In the vicinity of transmitter station 24 are distributed auxiliary receivers 28, 30, and 32, not all of which lie on the same great circle of the Earth. Auxiliary receivers 28 and 30 are connected to a computer 34 at transmitter station 24 by land transmission lines 36. Auxiliary receiver 32 is located at transmitter 24 so no land transmission line is needed for it. The output of a sweep frequency oscillator 25 is radiated to repeater 22. For best results, Equation 3 is satisfied by choosing the parameters of the system such that the sweep signal produces only one order of diffraction when reflected from repeater 22. The frequency at which the strongest reception of the sweep signal occurs at each of receivers 28, 30 and 32 is detected and this information relayed to computer 34. From this information the orientation of repeater 22, $\theta_{i_1}$, $\theta_{i_2}$, and $\theta_{i_3}$ is determined. The orientation of repeater 22 plus the instantaneous orbit parameters of satellite repeater 22 permits determination by computer 34 in the form of an analog voltage of the frequency of radiation from transmitter station 24 that establishes communication with receiver station 26. Computer 34 solves for the angle of reflection from repeater 22, $\theta_r$, in the direction of receiver station 26 as a function of the instantaneous satellite orbit parameters, the orientation of repeater 22, and the location of stations 24, 26, 28, and 30. Then the desired frequency of operation can be determined from Equation 3. The voltage produced by computer 34 is applied as a frequency control signal to a voltage controlled oscillator 37 which supplies a carrier signal to a transmitter unit 38. Information from a source 40 to be transmitted to receiver 26 is modulated upon the carrier signal in transmitter unit 38.

Once established, the frequency of transmitter station 24 can be maintained by continuous operation of the described circuit. Oscillator 37 should probably be operated in a frequency range well above that of sweep oscillator 25 if interaction between the two is to be avoided.

Figure 2:
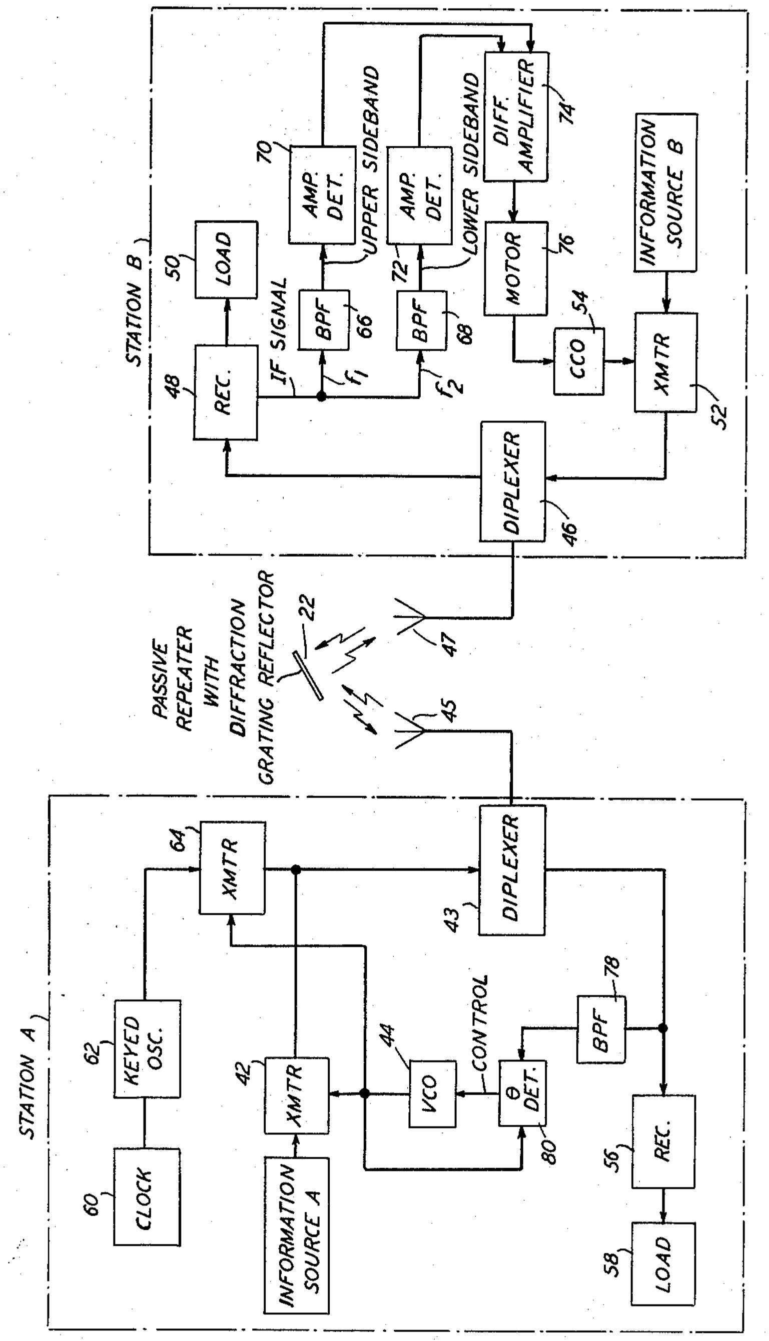
FIG. 2 illustrates another embodiment of the invention.

FIG. 2 discloses another space satellite communication system for carrying on two-way communications between ground stations A and B by way of passive repeater 22. In this case, at station A information from a source A is applied to a transmitter 42. This information is impressed upon a carrier supplied by a voltage controlled oscillator 44 in transmitter 42. The signal emanating from transmitter 42 is applied to a diplexer 43 which may be, for example, of the type disclosed in FIG. 9.5–3 on page 339 of Principles and Applications of Waveguide Transmission, by G. C. Southworth, D. Van Nostrand Company, Inc., 1950, for application to an antenna 45. The electromagnetic wave radiated from antenna 45 is reflected from repeater 22, as shown in FIG. 1A, to station B where it is intercepted by an antenna 47 and applied to a diplexer 46 for application to a receiver 48.

which demodulates the received wave and applies the information extracted therefrom to a load 50.

At station B information from a source B is applied to a transmitter 52 where it is modulated upon a carrier supplied by capacitor controlled oscillator 54 and then applied to diplexer 46 for radiation by antenna 47 to station A via repeater 22. At station A the signal transmitted from station B is intercepted by antenna 45 and applied from diplexer 43 to a receiver 56 for demodulation and application of the extracted information to a load 58.

Initially, transmission between station A and station B via repeater 22 can be established, that is a frequency is found providing reflection of a wave radiated by station A from repeater 22 in the direction of station B or vice versa, by sweeping the frequency of the carrier at station A and observing the frequency at which the strongest response occurs at station B. The frequency of oscillators 44 and 54 are then both adjusted to the determined frequency before closing the control loop described below. Alternatively, the initial frequency of operation of the system may be determined as explained above in conjunction with FIG. 1A and FIG. 1B. After transmission is established it is maintained by means of the following control circuitry.

A clock 60 at station A initiates periodic readjustment of the frequency of the carrier signal sources, i.e., oscillators 44 and 54, of the system. The output of clock 60 initiates a burst of pulses by a keyed oscillator 62 of a frequency somewhat above the band of the information from source A. The output of oscillator 62 is applied to a transmitter 64 for amplitude modulation upon the output of oscillator 44. Transmitter 64 produces two bursts of equal amplitude, symmetrically located in frequency about the output of transmitter 42, as modulation sidebands. These sidebands are combined with the output of transmitter 42, all of which are applied to diplexer 43 for radiation from antenna 45 to repeater 22.

At station B the intensity of the signal bursts received from repeater 22 is a measure of the frequency correction of the system required to maintain communications between stations A and B with changing repeater orientation. For example, if the upper sideband signal burst as received at station B is stronger than the lower sideband signal burst, the frequency of operation of the system needs to be lowered. The upper and lower sideband signal bursts are abstracted from receiver 48 at an intermediate frequency and separated one from the other by band pass filters 66 and 68, respectively, after which direct-current voltages proportional to their respective amplitudes are developed in amplitude detectors 70 and 72. The two direct-current voltages are subtracted in a difference amplifier 74 the output of which controls a motor 76. Motor 76 changes a variable capacitor in the tank circuit of oscillator 54 to adjust oscillator 54 to a frequency closer to the frequency of operation required to maintain communication between stations A and B.

A portion of the wave received at station A from station B is diverted through a band pass filter 78 which removes the modulation. This signal, representative of the carrier generated at station B, is employed as a synchronizing signal for oscillator 44. To this end a portion of the output from oscillator 44 and the output of band pass filter 78 are compared in phase in a phase detector 80 and the resulting signal, indicative of the phase difference between the input signals, is applied as a control voltage to adjust the frequency of oscillator 44 to conform to the synchronizing signal. Thus, the carriers generated at both stations are maintained at the same frequency.

In general, when a change in frequency of the system is called for because of a change in orientation of repeater 22, this is detected at station B and oscillator 54, supplying the carrier signal at station B, is adjusted in frequency until transmission from station B to station A is re-established. Moreover, since the carrier signal at station A is synchronized to the carrier signal at station B, it is also adjusted to re-establish transmission from station A to station B. The frequency of the upper and lower sideband burst signals is also adjusted to be symmetrically displaced about the new frequency of operation of the system by virtue of the application of the output of oscillator 44 to transmitter 64.

The communication system of FIG. 2 could be converted to a one-way transmission system in which station A transmits information to station B by simply eliminating load 58, receiver 56, and information source B. The output of oscillator 54 is transmitted unmodulated to station A and used to control oscillator 44 as described above.

What is claimed is:

1. A communication system comprising a first station, a second station, and a repeater station subject to variations in orientation relative to said first and second stations, said repeater having a reflector disposed on its surface the angle of reflection of impinging signals of which is controllable dependent upon a characteristic of said impinging signal, means for radiating an information signal from said first station toward said repeater, and means for controlling the angle of reflection of said reflector by changing said characteristic to compensate for variations in orientation of said reflector with respect to said first and second stations to preserve maximum transmission from said first station to said second station via said repeater.

2. In a communication system, the combination comprising a first station, a second station, and a repeater station subject to changes in orientation with respect to at least one of said first and second stations, said repeater station having a reflector radiating impinging electromagnetic waves at an angle dependent upon the frequency thereof, a source of carrier signals at said first station for conveying information to said second station via said repeater, and means for varying the frequency of said source to counteract changes in orientation of said repeater station and maintain communication between said first and said second stations.

3. A communication system comprising a transmitter, a receiver, and a reflector subject to changes in orientation with respect to said transmitter and said receiver, said reflector comprising a diffraction grating, a source of carrier signals of controllable frequency located at said transmitter, means for modulating information to be transmitted to said receiver upon said carrier, means for radiating said modulated carrier at said reflector, and means for controlling the frequency of said carrier source to maintain transmission between said transmitter and said receiver as said reflector changes in orientation.

4. In a communication system, a first station, a second station, and a repeater station for relaying information between said first station and said second station, said repeater having at least one reflective diffraction grating impressed upon its surface, a signal source of variable frequency located at said first station for carrying information to said second station via said repeater, and means for varying the frequency of said source to preserve maximum signal reception at said second station despite changes in position of said repeater relative to said first and second stations.

5. In a communication system, first and second terminal stations, a repeater subject to changes in orientation linking said stations, said repeater comprising a reflective diffraction grating, a source of signals of variable frequency at said first station, means for transmitting said signal from said first station toward said repeater, means for deriving a control quantity indicative of changes in the orientation of said repeater from said signal received at said second station, means for transmitting said control quantity back to said first station, and means for varying the frequency of said source responsive to said control quantity to preserve comunication between said stations.

6. In a communication system, first and second terminal stations, a repeater subject to change in orientation linking said stations, said repeater having a reflector radiating impinging electromagnetic waves at an angle dependent upon the frequency thereof, a source of signals of variable frequency at said first station, means for transmitting said signal from said first station to said second station via said repeater, means for deriving a control quantity indicative of changes in the orientation of said repeater from said signal received at said second station, means for transmitting said control quantity back to said first station, and means for varying the frequency of said source responsive to said control quantity to preserve communication between said stations.

7. In a communication system, first and second terminal stations, a repeater linking said stations comprising a reflective diffraction grating, said repeater being subject to changes in orientation with respect to said first and second stations, a source of carrier signals of variable frequency at said first station, means for modulating information to be conveyed to said second station upon said carrier signal, means for conveying said modulated signal and an auxiliary signal to said second station via said repeater, means for recovering said information at said second station, means for deriving a control signal representative of the change in frequency of said carrier signal required to maintain transmission between said first and second stations from said auxiliary signal recovered at said second station, means for transmitting said control signal back to said first station, and means for adjusting the frequency of said source to maintain transmission responsive to said control signal.

8. In a communication system, the combination comprising first and second communication stations, a repeater subject to changes in orientation relative to said stations for relaying information between said first and second stations, said repeater having a reflective diffraction grating disposed upon its surface, a first carrier source at said first station, means for modulating information to be conveyed to said second station upon said first carrier, means for transmitting said modulated first carrier to said second station via said repeater, means at said second station for recovering said information from said first station, a second carrier source located at said second station, means for modulating information to be conveyed to said first station upon said second carrier, means for transmitting said modulated second carrier to said first station via said repeater, means for recovering said information from said second station at said first station, means for transmitting from said first station an auxiliary signal to said second station via said repeater, means at said second station for deriving a control signal from the recovered auxiliary signal representative of changes in orientation of said repeater, means for adjusting the frequency of said second carrier source responsive to said control signal, and means for controlling said first carrier source responsive to said second carrier received at said first station.

References Cited in the file of this patent

UNITED STATES PATENTS

| | | |
|---|---|---|
| 2,169,553 | Bruce | Aug. 15, 1939 |
| 2,871,344 | Busignies | Jan. 27, 1959 |

OTHER REFERENCES

Stockman: "Communication by Means of Reflected Power," Proc. I.R.E., vol. 36, No. 10, October 1948, pp. 1196–1204.